United States Patent
Hagedorn

(10) Patent No.: US 8,952,661 B2
(45) Date of Patent: Feb. 10, 2015

(54) EMERGENCY POWER SUPPLY DEVICE

(75) Inventor: Ralf Hagedorn, Holdorf (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 391 days.

(21) Appl. No.: 13/318,501

(22) PCT Filed: Feb. 23, 2010

(86) PCT No.: PCT/EP2010/052234
§ 371 (c)(1), (2), (4) Date: Nov. 2, 2011

(87) PCT Pub. No.: WO2010/127885
PCT Pub. Date: Nov. 11, 2010

(65) Prior Publication Data
US 2012/0043760 A1  Feb. 23, 2012

(30) Foreign Application Priority Data
May 5, 2009 (DE) .................. 10 2009 025 747

(51) Int. Cl.
H01M 10/46 (2006.01)
F03D 7/02 (2006.01)
H02J 9/06 (2006.01)

(52) U.S. Cl.
CPC .......... *F03D 7/0224* (2013.01); *F05B 2260/74* (2013.01); *F05B 2260/76* (2013.01); *H02J 9/062* (2013.01); *Y02E 10/721* (2013.01); *Y02E 10/723* (2013.01); *Y02E 10/766* (2013.01)
USPC ............................................. 320/116

(58) Field of Classification Search
USPC .................... 290/44; 320/106, 116
See application file for complete search history.

(56) References Cited

U.S. PATENT DOCUMENTS

| | | | | |
|---|---|---|---|---|
| 3,374,779 A * | 3/1968 | Fergus | ......... | 123/179.1 |
| 5,617,004 A * | 4/1997 | Kaneko | ......... | 320/119 |
| 5,629,601 A * | 5/1997 | Feldstein | ......... | 320/119 |
| 5,701,068 A * | 12/1997 | Baer et al. | ......... | 320/119 |
| 7,336,054 B2 * | 2/2008 | Crisp et al. | ......... | 320/106 |

(Continued)

FOREIGN PATENT DOCUMENTS

| | | |
|---|---|---|
| DE | 103 35 575 | 3/2005 |
| DE | 102005030709 A1 | 1/2007 |

(Continued)

OTHER PUBLICATIONS

English Translation of the International Preliminary Report on Patentability (Chapter I of the Patent Cooperation Treaty) for PCT/EP2010/052234, issued Nov. 15, 2011.

(Continued)

*Primary Examiner* — Joseph Waks
(74) *Attorney, Agent, or Firm* — Harness, Dickey & Pierce, P.L.C.

(57) ABSTRACT

An emergency power supply device for a rotor blade adjustment system of a wind turbine is disclosed. The emergency power supply device includes a plurality of electric power accumulators and a plurality of electric charging units. The number of charging units corresponds to the number of electric power accumulators. An electric circuit is operable to electrically couple each of the electric charging units to a plurality of the electric power accumulators and each of the electric power accumulators to a plurality of the charging units.

15 Claims, 3 Drawing Sheets

(56) References Cited

U.S. PATENT DOCUMENTS

| | | | |
|---|---|---|---|
| 7,566,981 B2 * | 7/2009 | Kunkel et al. | 290/44 |
| 2004/0012371 A1 * | 1/2004 | Ott et al. | 320/116 |
| 2007/0090797 A1 * | 4/2007 | Glosser, Jr. et al. | 320/116 |
| 2012/0056429 A1 * | 3/2012 | Hagedorn | 290/44 |

FOREIGN PATENT DOCUMENTS

| | | |
|---|---|---|
| DE | 10 2007 006966 A1 | 8/2008 |
| DE | 10 2007 049313 A1 | 4/2009 |
| EP | 1739807 A2 | 1/2007 |
| WO | WO-02/05406 A1 | 1/2002 |
| WO | WO-2006/069573 A1 | 7/2006 |

OTHER PUBLICATIONS

International Search Report (in German with English translation) and Written Opinion (in German) for PCT/EP2010/052334, mailed Mar. 2, 2011; ISA/EP.

* cited by examiner

EMERGENCY POWER SUPPLY DEVICE

CROSS-REFERENCE TO RELATED APPLICATIONS

This application is a 371 U.S. National Stage of International Application No. PCT/EP2010/052234, filed Feb. 23, 2010, and claims priority to German Patent Application No. 10 2009 025 747.0 filed May 5, 2009, the disclosures of which are herein incorporated by reference in their entirety.

FIELD

The invention relates to an emergency power supply device for a rotor blade adjustment system of a wind turbine, with a plurality of electric power accumulators, an electric charging unit and an electric circuit arrangement, by means of which the charging unit can be electrically coupled to a plurality of the power accumulators. The invention furthermore relates to a method for operating an emergency power supply device of a rotor blade adjustment system of a wind turbine.

BACKGROUND

In modern wind turbines, the power and rotational speed control takes place by means of changing the rotor blade angle, for the adjustment of which blade adjustment systems are used. Typically, these are hydraulic or electric systems. Furthermore, the adjustment of the blade angle is also used to shut down and interrupt a wind turbine, so the blade adjustment system is the primary braking system of the wind turbine. In order to ensure the availability of the blade adjustment system, power accumulators are used, which, in the event of a failure of the primary power supply of the wind turbine, supply the system with power. In electric blade adjustment systems, accumulators are typically used as the power accumulators, the availability of which is maintained by charging systems. Generally, these power accumulators are self-sufficient for each rotor blade, a charging unit that switches over cyclically to the individual accumulators by means of switching elements typically being used.

An adjusting drive for a rotor blade of a wind turbine is known from DE 10 2005 030 709 A1, which comprises an electric motor and a frequency converter. Connected to the intermediate circuit of the frequency converter is an emergency power supply device, which comprises a power accumulator providing an electric support voltage and having a series connection of accumulator units, for which power accumulator a charging mechanism is provided, which is configured to charge an individual accumulator unit. Furthermore, a switching mechanism is provided, with which an individual one of the accumulator units can be connected to the charging mechanism.

The drawback is that when the charging mechanism fails, the emergency power supply device can no longer be operated, so the wind turbine has to be shut down. Furthermore, no optimal full charge or recharge is possible by means of the cyclic switching over of the charging unit. In particular, the recharging times for each rotor blade add up owing to the use of only one charging unit.

To increase the availability, it is possible to use two charging units and to construct a redundant system by means of a suitable arrangement of the switching elements. The recharging times then still add up, however.

Furthermore, the use of a separate charging unit for each axle is possible. The recharging time is reduced by this but the failure of a charging unit still leads to a failure of the system.

SUMMARY

Proceeding from this, the invention is based on the object of developing an emergency power supply device of the type mentioned at the outset in such a way that the availability can be increased with a lower recharging period.

This object is achieved according to the invention by an emergency power supply device according to claim 1 and by a method according to claim 15. Preferred developments of the invention are given in the sub-claims.

The emergency power supply device according to the invention for a rotor blade adjustment system of a wind turbine has a plurality of electric power accumulators, an electric charging unit and an electric circuit arrangement, by means of which the charging unit can be electrically coupled to a plurality of the power accumulators, one or a plurality of additional charging units being provided, so that the number of charging units corresponds to the number of power accumulators, and wherein, by means of the circuit arrangement, each of the charging units can be electrically coupled to a plurality of the power accumulators and each of the power accumulators can be electrically coupled to a plurality of the charging units.

In the emergency power supply device according to the invention, the task of a faulty charging unit can be taken over by one or at least one of the other charging units, so the availability of the emergency power supply device is relative high. As, furthermore, the number of charging units corresponds to the number of power accumulators, when the charging units are functioning, each of the power accumulators can be electrically connected, preferably permanently, to one of the charging units, in each case, so that the recharging period can be kept relatively short. Furthermore, a constant switching over of charging units to power accumulators can be avoided, so the switching elements do not constantly have to be actuated, but only in the case of a fault.

Each of the charging units is preferably not simultaneously coupled to a plurality of the power accumulators. In particular, each of the charging units is at all times only coupled to a single power accumulator, or none of them. Furthermore, each of the power accumulators is preferably not simultaneously coupled to a plurality of the charging units. In particular, each of the power accumulators is at all times only coupled to a single one of the charging units, or none of them.

According to a configuration of the invention, each of the charging units can be electrically coupled to each of the power accumulators by means of the circuit arrangement. Preferably, however, each of the charging units can be coupled to two of the power accumulators and/or each of the power accumulators can be coupled to two of the charging units by means of the circuit arrangement.

One, or precisely one, of the charging units as the main charging unit is preferably associated with each of the power accumulators. In a normal operating state, in particular each of the power accumulators is only, preferably permanently, electrically coupled to the main charging unit associated with it. The normal operating state is, in particular, characterised in that all the charging units are functioning. On the other hand, in the case of a fault, i.e. when one or a plurality of the charging units fails, at least one of the power accumulators is preferably electrically fed by one of the charging units not associated with it as the main charging unit. It is thus possible to charge the at least one power accumulator even when the main charging unit associated with it has failed.

Another, or precisely one other, of the charging units, as the auxiliary charging unit, is preferably associated with each of the power accumulators. In a normal operating state, each of the power accumulators, in particular, is electrically decoupled from the auxiliary charging unit associated with it. On the other hand, in the event of a fault, i.e. if one or a plurality of the charging units fails, at least one of the power accumulators, the main charging unit of which has failed, is preferably electrically fed by the auxiliary charging unit associated with it. In particular, one, or at least one, of the charging units is electrically coupled in an alternating manner to a first and to a second of the power accumulators, with which it is associated as the main charging unit (of the first power accumulator) or as the auxiliary charging unit (of the second power accumulator), if the main charging unit associated with the second power accumulator has failed.

The circuit arrangement preferably has, per power accumulator, an electric main switch associated therewith, so that each of the power accumulators is, or can be, electrically coupled by the main switch associated with it to the main charging unit associated with it. Furthermore, the circuit arrangement, per power accumulator, preferably has an electric auxiliary switch associated with it, so that each of the power accumulators is, or can be, electrically coupled by the auxiliary switch associated with it to the auxiliary charging unit associated with it. Owing to the combination of main switches and auxiliary switches it is possible by means of the circuit arrangement to electrically couple, or be able to couple, each of the power accumulators to the main charging unit associated with it and to the auxiliary charging unit associated with it.

Electrically connected to the circuit arrangement there is preferably an electric control device, by means of which the circuit arrangement and/or its switches are, or can be, controlled or actuated. The control device can be configured integrated with, or external to, the circuit arrangement. The switches of the circuit arrangement preferably comprise the main switches and/or the auxiliary switches. In particular, a failure of one or a plurality of the charging units can be detected by the control device, so that the switches are, or can be, switched by means of the control device according to the functional state of the charging units. The switches are, for example, formed by relays and/or transistors.

Each of the power accumulators may comprise one or a plurality of electric capacitors. Furthermore, it is possible for the power accumulators to comprise electric capacitors and electric accumulators. Each of the electric power accumulators, however, preferably has one or a plurality of electric accumulators, which can also be called batteries here.

The charging units are, in particular, designed such that the charging currents supplied to the power accumulators are, or can be, controlled and/or regulated by means of the charging units. Thus, a controlled charging of the power accumulators is possible, which, in particular, in the case of batteries as the power accumulators, increases, or can increase, the service life of the batteries.

Conventional charging methods, for example those known from relevant standards, can be carried out by means of the charging units. The power accumulators are, however, preferably charged by a pulse charging technique, which is carried out, or can be carried out, by means of the charging units, in particular. An asymmetrical cell charge can therefore be avoided if the power accumulators are batteries.

As the emergency power supply device according to the invention is used, in particular, in a rotor blade adjustment system of a wind turbine, the power accumulators are preferably, or can be, electrically coupled to electric motors, which are preferably coupled, in particular mechanically coupled, to rotor blades of the wind turbine. In the case of a network failure, the power accumulators are electrically coupled to the electric motors, so that the rotor blades of the wind turbine can be rotated by means of the electric motors into a desired position, in particular into the so-called vane position.

The electric motors are preferably electrically coupled to power converters or frequency converters and are fed by these or can be fed by these, which are preferably fed, or can be fed, together with the charging units from the same electric network. The network may, for example, be a local wind turbine network, a network comprising a plurality of wind turbines, the public power supply network or another network. The network is, in particular, an alternating current network, but may also be a direct current network.

Wind turbines regularly have two or three rotor blades. Therefore, the number of power accumulators is also preferably at least two or at least three. In particular, the number of power accumulators is three.

The invention furthermore relates to a wind turbine with a holder, on which a rotor, which can be driven, or is driven, by wind is rotatably mounted about a rotor axis, which rotor has a rotor hub and a plurality of rotor blades, which are in each case rotatably mounted on the rotor hub about a blade axis, and with a rotor blade adjustment system, which, per rotor blade, has at least one electric motor, by means of which the respective rotor blade can be rotated about the respective blade axis. Furthermore, an emergency power supply device according to the invention is provided, the power accumulators of which are, or can be, electrically coupled to the electric motors. The emergency power supply device can be developed according to all the configurations described in this context.

The number of rotor blades is preferably at least two or at least three. In particular, the number of rotor blades is three. Each of the blade axes extends, in particular, transversely or obliquely with respect to the rotor axis.

The invention also relates to the use of an emergency power supply device according to the invention for a rotor blade adjustment system of a wind turbine, wherein when all the charging units are in a functional state (normal operating state), each of the power accumulators is, or will be, preferably permanently electrically coupled to precisely one of the charging units, and wherein after, upon and/or during a failure of at least one of the charging units, at least one of the charging units that has not failed is electrically coupled in an alternating manner to at least two of the power accumulators. Therefore, despite the failure of a charging unit, each of the power accumulators is electrically charged.

Furthermore, the invention relates to a method for operating an emergency power supply device of a rotor blade adjustment system of a wind turbine, wherein the emergency power supply device comprises a plurality of electric power accumulators and a corresponding number of electric charging units, wherein, when all the charging units are in a functional state, each of the power accumulators is, or will be, preferably permanently, electrically coupled to precisely one of the charging units, and wherein after, upon and/or during a failure of at least one of the charging units, at least one of the charging units that has not failed is electrically coupled in an alternating manner to at least two of the power accumulators.

However, after, upon and/or during the failure, the permanent electric coupling between at least one other of the charging units that has not failed and the power accumulator connected therewith is also retained.

For the use according to the invention and the method according to the invention, the emergency power supply device and/or the wind turbine can be developed according to all the described configurations.

DRAWINGS

The invention will be described below with the aid of a preferred embodiment with reference to the drawings, in which.

DETAILED DESCRIPTION

Figure 1:
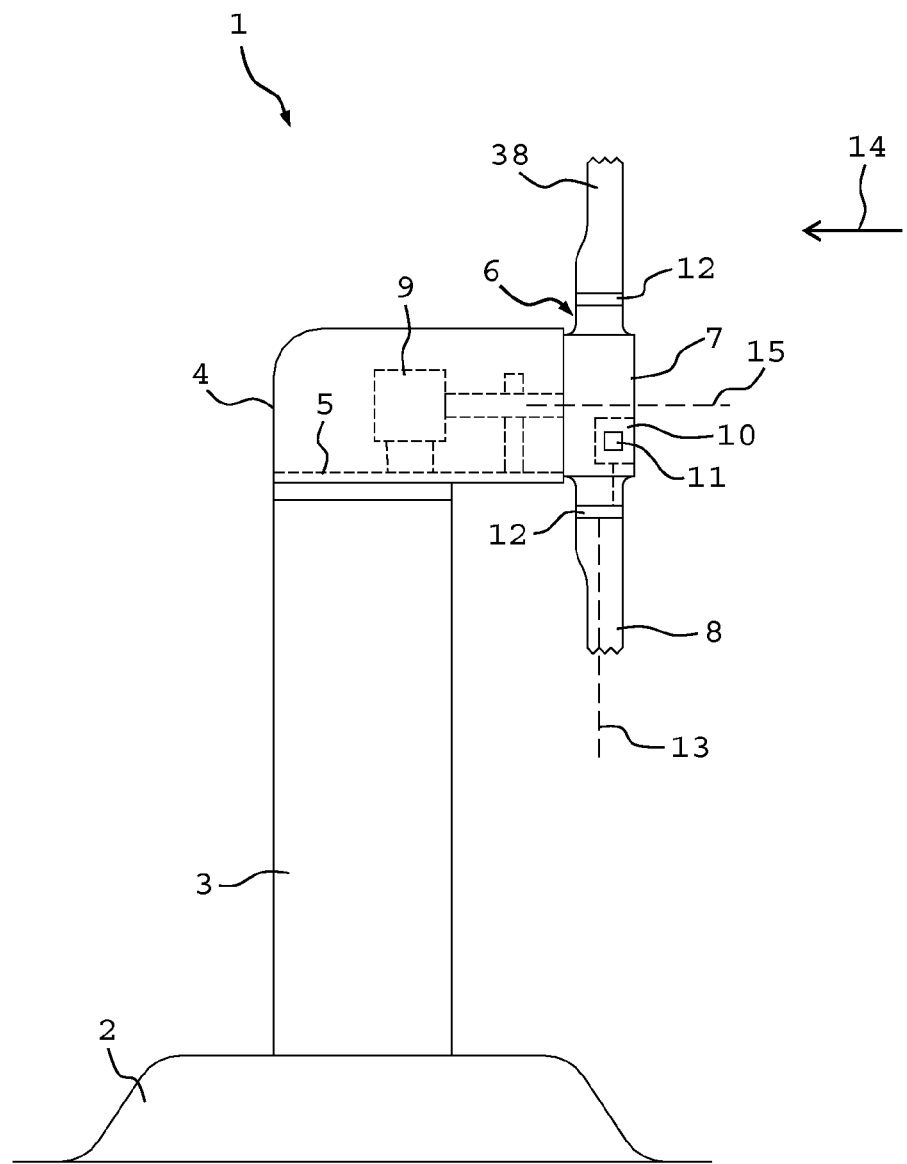
FIG. 1 shows a schematic view of a wind turbine.

A schematic view of a wind turbine 1 can be seen from FIG. 1, which comprises a tower 3 standing on a base 2, a machine housing 4 being arranged at the end of said tower remote from the base 2. The machine housing 4 has a holder (carrier) 5, on which a rotor 6 is rotatably mounted, which comprises a rotor hub 7 and a plurality of rotor blades 8, 38 and 39 connected thereto (see also FIG. 4). The rotor 6 is mechanically coupled to an electric generator 9, which is arranged in the machine housing 4 and fastened to the carrier 5.

Figure 4:
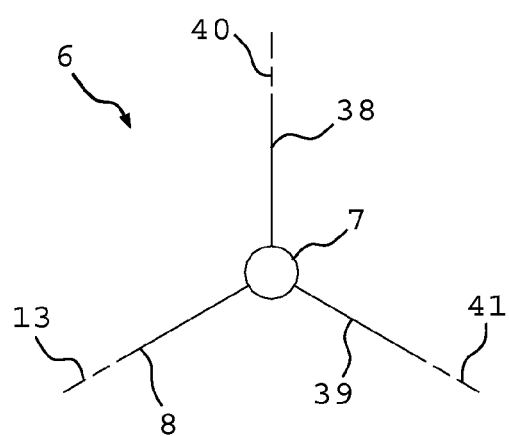

A rotor blade adjustment system 10 is arranged in the rotor hub 7 and comprises an emergency power supply device 11 according to one embodiment of the invention and blade angle adjustment drives 12, by means of which the rotor blades 8, 38 and 39 can be rotated about their respective longitudinal axis 13, 40 or 41 relative to the rotor hub 7 (see also FIG. 4). The rotor 6 is rotated by wind force 14 about a rotor axis 15.

FIG. 4 shows a schematic plan view of the rotor 6, so that the three rotor blades 8, 38 and 39 can be seen.

Figure 2:
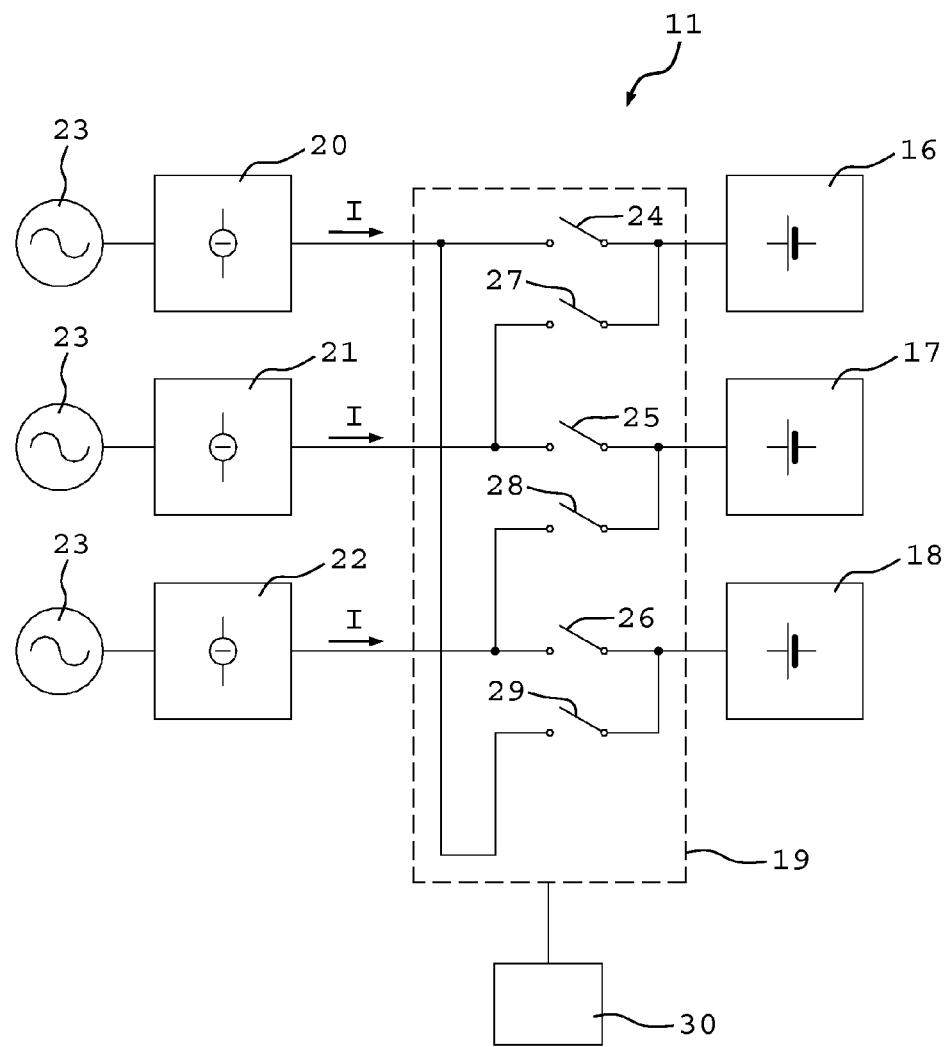
FIG. 2 shows a schematic block diagram of an emergency power supply device according to one embodiment of the invention.

A schematic view of the emergency power supply device 11 can be seen from FIG. 2, three batteries 16, 17 and 18 being coupled, or able to be coupled, by means of a circuit arrangement 19 to three battery charging units 20, 21 or 22. In this case, the charging unit 20 is associated with the battery 16 as the main charging unit, the charging unit 21 is associated with the battery 17 as the main charging unit, and the charging unit 22 is associated with the battery 18 as the main charging unit. Furthermore, the charging unit 21 is associated with the battery 16 as the auxiliary charging unit, the charging unit 22 is associated with the battery 17 as the auxiliary charging unit, and the charging unit 20 is associated with the battery 18 as the auxiliary charging unit. The charging units 20, 21 and 22 are coupled to an electric alternating current network 23 and are fed from this.

The circuit arrangement has three main switches 24, 25 and 26 and three auxiliary switches 27, 28 and 29, so that each of the batteries can be electrically coupled to the respective main charging unit and to the respective auxiliary charging unit by means of the main and auxiliary switches. In this case, the main switch 24 and the auxiliary switch 27 are associated with the battery 16, the main switch 25 and the auxiliary switch 28 are associated with the battery 17, and the main switch 26 and the auxiliary switch 29 are associated with the battery 18.

A normal operating state is characterised in that all the charging units 20, 21 and 22 are ready to function. In particular, in the normal operating state, the main switches 24, 25 and 26 are closed and the auxiliary switches 27, 28 and 29 are open. In this state, each of the batteries is exclusively electrically connected to the main charging unit associated with it. The electric charging currents I supplied to the batteries 16, 17 and 18 by the charging units can be regulated and/or controlled here by means of the charging units 20, 21, 22. If one of the charging units fails, for example the charging unit 22 here, the battery 18 can be charged by the charging unit 20 by closing the auxiliary switch 29, the switch 26 being opened, in particular. The batteries 16 and 18 are then charged in an alternating manner by the charging unit 20, whereas the charging unit 21 permanently charges the battery 17. The same applies, if the charging unit 21 or the charging unit 20 fails. If the charging unit 21 fails, the battery 17 can be charged by the charging unit 22 by closing the auxiliary switch 28, the switch 25 being opened, in particular. The batteries 17 and 18 are then charged in an alternating manner by the charging unit 22, whereas the charging unit 20 permanently charges the battery 16. If the charging unit 20 fails, the battery 16 can be charged by the charging unit 21 by closing the auxiliary switch 27, the switch 24 in particular being opened. The batteries 16 and 17 are then charged in an alternating manner by the charging unit 21, whereas the charging unit 22 permanently charges the battery 18.

According to FIG. 2, the main switch 24 is switched between the charging unit 20 and the battery 16, the main switch 25 is switched between the charging unit 21 and the battery 17, and the main switch 26 is switched between the charging unit 22 and the battery 18. Furthermore, the auxiliary switch 27 is switched between the charging unit 21 and the battery 16, the auxiliary switch 28 is switched between the charging unit 22 and the battery 17 and the auxiliary switch 29 is switched between the charging unit 20 and the battery 18.

The switches of the circuit arrangement 19 can be actuated by means of an electric control device 30, which is electrically connected to the circuit arrangement 19. Furthermore, a failure of one or a plurality of the charging units can be detected by the control device 30, so that the switches are switched, or can be switched, by means of the control device 30 according to the functional state of the charging units.

Figure 3:
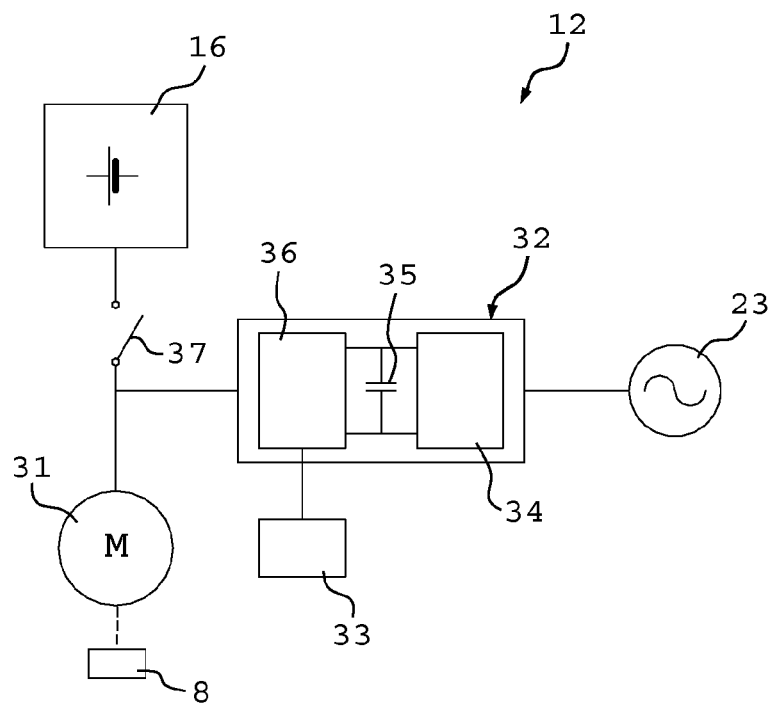
FIG. 3 shows a schematic block diagram of part of a rotor blade adjustment system for a rotor blade and FIG. 4 shows a schematic plan view of the rotor of the wind turbine.

A schematic block diagram of one of the blade angle adjustment drives 12 of the rotor blade adjustment system 10 for the rotor blade 8 is shown in FIG. 3, an electric motor 31 configured as a direct current motor here being electrically coupled to a converter 32, which is connected to the network 23 and is fed from it. Furthermore, the converter 32 is connected to a controller 33, by means of which the converter 32 is controlled. The converter 32 comprises a rectifier 34, an intermediate circuit with a capacitor 35 and an output stage 36, which, for example, is a direct current chopper controller here or another unit for providing a controllable direct current for the electric motor 31. If the network 23 fails, a switch 37 is closed, by means of which the battery 16 is directly switched to the electric motor 31. As a result, the rotor blade 8 mechanically coupled to the electric motor 31 is rotated about the blade axis 13 into the vane position. Blade angle adjustment drives are also provided for the rotor blades 38 and 39 and correspond to that shown in FIG. 3, but are provided with the batteries 17 or 18 instead of the battery 16. The rotor blades 38 and 39 can also therefore be rotated about their blade axis 40 or 41 into the vane position in the event of a network failure.

What is claimed is:

1. An emergency power supply device for a rotor blade adjustment system of a wind turbine comprising:
 a plurality of electric power accumulators;
 a first electric charging unit;

an electric circuit electrically coupling the first electric charging unit to the plurality of the electric power accumulators; and at least one additional electric charging unit which in combination with the first electric charging unit defines a plurality of electric charging units such that the total number of electric charging units corresponds to the total number of electric power accumulators, the electric circuit being operable to electrically couple each of the plurality of electric charging units to a plurality of electric power accumulators and also operable to electrically couple each of the electric power accumulators to a plurality of the charging units.

2. The emergency power supply device according to claim 1, wherein each of the plurality of charging units is operable to electrically couple to each of the electric power accumulators by means of the circuit.

3. The emergency power supply device according to claim 1, wherein each of the electric power accumulators is associated with precisely one of the plurality of charging units as a main charging unit, and precisely one other of the charging units as an auxiliary charging unit.

4. The emergency power supply device according to claim 3, wherein each of the electric power accumulators is electrically coupled only to the main charging unit associated with each of the electric power accumulators when all the charging units are in a functional state.

5. The emergency power supply device according to claim 3, wherein the auxiliary charging unit electrically feeds at least one of the electric power accumulators associated with the auxiliary charging unit if at least one of the charging units fails.

6. The emergency power supply device according to claim 3, wherein one of the electric charging units electrically couples in an alternating manner to a first electric power accumulator and a second electric power accumulator, with which the electric charging unit is associated as the main charging unit and the auxiliary charging unit if the main charging unit associated therewith fails.

7. The emergency power supply device according to claim 3, wherein for each of the plurality of electric power accumulators the electric circuit comprises an electric main switch associated with each of the electric power accumulators, and wherein each of the electric power accumulators is operable to electrically couple by the main switch to the main charging unit associated with the electric power accumulator.

8. The emergency power supply device according to claim 7, wherein for each of the plurality of electric power accumulators the electric circuit further comprises an electric auxiliary switch associated with each of the electric power accumulator, and wherein each of the electric power accumulators is operable to electrically couple by the auxiliary switch to the auxiliary charging unit associated with the electric power accumulator.

9. The emergency power supply device according to claim 1, wherein each of the electric power accumulators comprises at least one electric battery.

10. The emergency power supply device according to claim 1, wherein the charging units comprise a regulator to regulate a charging current supplied to the electric power accumulator.

11. The emergency power supply device according to claim 1, wherein the electric power accumulators are operable to electrically couple to an electric motor mechanically coupled to a rotor blade of a wind turbine.

12. The emergency power supply device according to claim 11, wherein each electric motor is electrically coupled to a power converter and operable to be electrically fed by the power converter, the power converter operable to be electrically fed by an electric network that also feeds the charging units.

13. The emergency power supply device according to claim 1, wherein the number of electric power accumulators is three.

14. The emergency power supply device according to claim 1, wherein when all the charging units are in a functional state, each of the electric power accumulators is permanently electrically coupled to precisely one of the charging units, and wherein at least one of the charging units, that has not failed, electrically couples in an alternating manner to at least two of the electric power accumulators if a failure of at least one of the charging units occurs.

15. The emergency power supply device according to claim 1, wherein the charging units are coupled to and fed from an electric alternating current network.

* * * * *